United States Patent
Siddle et al.

(10) Patent No.: US 9,454,909 B1
(45) Date of Patent: Sep. 27, 2016

(54) FIREARMS TRAINING METHOD USING PROTOCOL BASED UPON THREAT PATTERN RECOGNITION

(71) Applicant: Human Factor Research Group, inc., Millstadt, IL (US)

(72) Inventors: Bruce K. Siddle, Millstadt, IL (US); Jonathan Siddle, Millstadt, IL (US)

(73) Assignee: Human Factor Research Group, Inc., Millstadt, IL (US)

( * ) Notice: Subject to any disclaimer, the term of this patent is extended or adjusted under 35 U.S.C. 154(b) by 158 days.

(21) Appl. No.: 14/099,212

(22) Filed: Dec. 6, 2013

Related U.S. Application Data

(60) Provisional application No. 61/734,134, filed on Dec. 6, 2012.

(51) Int. Cl.
   G09B 9/00 (2006.01)
   F41A 33/00 (2006.01)

(52) U.S. Cl.
   CPC .............. G09B 9/003 (2013.01); F41A 33/00 (2013.01)

(58) Field of Classification Search
   CPC ........ F41A 33/00; F41A 33/02; F41A 33/04; F41A 33/06; G09B 9/003; G09B 9/00; G09B 19/0023; G09B 19/003; G09B 19/0038
   See application file for complete search history.

(56) References Cited

U.S. PATENT DOCUMENTS

| | | |
|---|---|---|
| 4,948,371 A | 8/1990 | Hall |
| 5,882,204 A | 3/1999 | Iannazo et al. |
| 6,183,259 B1 | 2/2001 | Macri et al. |
| 6,602,075 B2 | 8/2003 | Adams |
| 6,652,284 B2 | 11/2003 | August et al. |
| 6,749,432 B2 | 6/2004 | French et al. |
| 7,951,045 B1 | 5/2011 | Brader |
| 8,267,691 B1* | 9/2012 | Ferris ...................... F41A 33/00 434/11 |
| 2012/0214136 A1 | 8/2012 | Stone |
| 2012/0231840 A1 | 9/2012 | Calman et al. |

* cited by examiner

*Primary Examiner* — Timothy A Musselman
(74) *Attorney, Agent, or Firm* — Thompson Coburn LLP; Matthew Himich

(57) ABSTRACT

A training simulation depicts an assailant presenting a weapon to engage a trainee to simulate a deadly force encounter. The simulation has a recognition portion that is representative of the assailant presenting the weapon to engage the trainee. In accordance with a step of the method, the trainee is instructed by presenting the recognition portion to the trainee at least three times: a first time weapon pattern recognition presentation being the presentation of the recognition portion of the simulation at first speed corresponding to real time, a second time weapon pattern recognition presentation being the presentation of the recognition portion of the simulation at a second speed that is less than the first speed, and a third time weapon pattern recognition presentation being the presentation of the recognition portion of the simulation at a third speed that is less than the first speed but greater than the second speed.

19 Claims, 11 Drawing Sheets

Test 1

| | Aggressor Movement Time (a) | Officer First Shot Fired (b) | Officer Reaction Time (c) | (average) # of rounds fired (d) | (average) # of rounds on Target (e) | Officer Wounded (f) | Accuracy (g) |
|---|---|---|---|---|---|---|---|
| 1. Primed Movement Time (Drawn Weapon, High Ready) | 0.96 | 2.43 | 1.47 | 3.44 | 3.18 | N/A | 90.90% |
| 2. Primed Movement Time (Holstered Weapon Drawn) | 0.96 | 2.61 | 1.65 | 3.57 | 3.37 | N/A | 92.64% |
| 3. Action /Reaction Drill (Drawn Weapon, High Ready) | 0.86 | 1.6 | 0.74 | 5.49 | 4.94 | 31/31 | 88.18% |
| 4. Startle Response RT | 0.78 | 0.86 | 0.08 | 6.82 | 1.46 | 31/31 | 23.88% |
| 5. Exposure 1 (Holstered Weapon Drawn) | 0.86 | 2.11 | 1.25 | 4.26 | 3.92 | 5/31 | 87.15% |
| 6. Exposure 2 (Holstered Weapon Drawn) | 0.86 | 2.08 | 1.22 | 4.65 | 4.38 | 1/31 | 88.52% |
| 7. Exposure 3 (Holstered Weapon Drawn) | 0.86 | 1.93 | 1.07 | 5.26 | 4.87 | 0/31 | 91.13% |

Test 1

|  | Aggressor Movement Time (a) | Officer First Shot Fired (b) | Officer Reaction Time (c) | (average) # of rounds fired (d) | (average) # of rounds on Target (e) | Officer Wounded (f) | Accuracy (g) |
|---|---|---|---|---|---|---|---|
| 1. Primed Movement Time (Drawn Weapon, High Ready) | 0.96 | 2.43 | 1.47 | 3.44 | 3.18 | N/A | 90.90% |
| 2. Primed Movement Time (Holstered Weapon Drawn) | 0.96 | 2.61 | 1.65 | 3.57 | 3.37 | N/A | 92.64% |
| 3. Action /Reaction Drill (Drawn Weapon, High Ready) | 0.86 | 1.6 | 0.74 | 5.49 | 4.94 | 31/31 | 88.18% |
| 4. Startle Response RT | 0.78 | 0.86 | 0.08 | 6.82 | 1.46 | 31/31 | 23.88% |
| 5. Exposure 1 (Holstered Weapon Drawn) | 0.86 | 2.11 | 1.25 | 4.26 | 3.92 | 5/31 | 87.15% |
| 6. Exposure 2 (Holstered Weapon Drawn) | 0.86 | 2.08 | 1.22 | 4.65 | 4.38 | 1/31 | 88.52% |
| 7. Exposure 3 (Holstered Weapon Drawn) | 0.86 | 1.93 | 1.07 | 5.26 | 4.87 | 0/31 | 91.13% |

Fig. 1

Test 2

| | Aggressor Movement Time (a) | Officer First Shot Fired (b) | Officer Reaction Time (c) | (average) # of rounds fired (d) | (average) # of rounds on Target (e) | Officer Wounded (f) | Accuracy (g) |
|---|---|---|---|---|---|---|---|
| 1. Primed Movement Time (Drawn Weapon, High Ready) | 0.96 | 1.81 | 1.7 | 3.02 | 2.85 | | 91.35% |
| 2. Primed Movement Time (Holstered Weapon Drawn) | 0.96 | 2.17 | 1.73 | 3.49 | 3.34 | | 96.55% |
| 3. Action /Reaction Drill (Drawn Weapon, High Ready) | 0.86 | 1.72 | 0.86 | 5.38 | 5.02 | | 88.95% |
| 4. Startle Response RT | 0.78 | 1.32 | 0.92 | 5.02 | 1.34 | | 30.90% |
| 5. Exposure 1 (Holstered Weapon Drawn) (real time) | 0.86 | 2.32 | 1.46 | 5.15 | 4.8 | | 92.05% |
| 6. Exposure 2 (Holstered Weapon Drawn) (4 x real time) | 3.1 | 2.74 | (-) 0.36 | 4.62 | 4.52 | | 97.70% |
| 7. Exposure 3 (Holstered Weapon Drawn) (2 x real time) | 1.82 | 3.02 | 1.2 | 5.33 | 5.64 | | 96.60% |
| 8. Exposure 4 (Holstered Weapon Drawn) (real time) | 0.86 | 2.27 | 1.41 | 4.86 | 4.71 | | 91.70% |

Fig. 2

Tactical-Threat Pattern Recognition Firearms Training
Pattern Recognition Drill: Aggressor Drawn Weapon -- Low Ready Position
*Description of Threat Pattern:*
Assailant has weapon drawn and held at the side of his leg. On cue, the assailant raises the weapon to eye level and fires.

*Description of Officer Tactical Firearms Engagement:*
Upon threat recognition, the officer will perform the following steps.
Evade (step and slide out of kill zone), Draw, Assess, Fire 2 rounds I.     Weapon Recognition Drill
    Description: Student watches video of aggressor raising a weapon from inside Position, Level I and Level II, speed intervals of 1 second, 4 seconds, 2 seconds and back to 1 second.
1.     1 second exposure / Inside Position / Dry Fire - 3 reps
2.     4 second exposure / Inside Position / Dry Fire - 3 reps
4.     2 second exposure / Inside Position / Dry Fire - 3 reps
5.     1 second exposure / Inside Position / Dry Fire - 3 reps
6.     1 second exposure / Level I Strong Side/ Dry Fire - 3 reps
7.     4 second exposure / Level I Strong Side / Dry Fire - 3 reps
8.     2 second exposure / Level I Strong Side / Dry Fire - 3 reps
9.     1 second exposure / Level I Strong Side / Dry Fire - 3 reps
10.     1 second exposure / Level II Strong Side / Dry Fire - 3 reps
11.     4 second exposure / Level II Strong Side/ Dry Fire - 3 reps
12.     2 second exposure / Level II Strong Side / Dry Fire - 3 reps
13.     1 second exposure / Level II Strong Side / Dry Fire - 3 reps
14.     1 second exposure / Level I Weak Side/ Dry Fire - 3 reps
15.     4 second exposure / Level I Weak Side / Dry Fire - 3 reps
16.     2 second exposure / Level I Weak Side / Dry Fire - 3 reps
17.     1 second exposure / Level I Weak Side / Dry Fire - 3 reps
18.     1 second exposure / Level II Strong Side/ Dry Fire - 3 reps
19.     4 second exposure / Level II Strong Side/ Dry Fire - 3 reps
20.     2 second exposure / Level II Strong Side / Dry Fire - 3 reps
21.     1 second exposure / Level II Strong Side / Dry Fire - 3 reps II.     Static Training Exercise: Tactical Firearms Engagement
    Description: Students are introduced to the tactical firearms engagement method of shooting, which includes Evade (step and slide out of kill zone), Draw, Assess, Fire.
1. Evade (Step & Slide) - 5 reps / Static Speed
2. Evade, Draw and Assess - 5 reps / Static Speed
3. Evade, Draw, Assess, Dry Fire - 5 reps / Static Speed III.     Static Training Exercise: Silhouette Target E-Fire Exercise:
    Description: Officer engages silhouette target
1.     Instructor Guided (voice commands) static walk through E-fire exercise:
        "Evade", "Draw", "Assess", "Fire" (E-Fire) - 5 reps
2.     5 second exposure Tactical Engagement, Evade, Draw, Assess, Dry Fire - 3 reps
3.     3 second exposure Tactical Engagement, Evade, Draw, Assess, Dry Fire - 3 reps
4.     2 second exposure Tactical Engagement, Evade, Draw, Assess, Dry Fire - 3 reps IV.     Deadly Force Context Recognition: Aggressor Target Inoculation Exercise
    Description: Aggressor target raises weapon and fires 2 rounds (pellets) into the kill zone at the designated (timed) intervals. Officer Evades, Draws, Assesses target (only)
1. 3 second exposure Tactical Engagement, Evade, Draw, Assess - 3 reps
2. 2 second exposure Tactical Engagement, Evade, Draw, Assess - 3 reps
3. 1 second exposure Tactical Engagement, Evade, Draw, Assess - 3 reps V.     Deadly Force Context Recognition: Aggressor Target Engagement Exercise
    Description: Aggressor target raises weapon and fires 2 rounds (pellets) into the kill zone at the designated (timed) intervals. Officer Evades, Draws, Assesses, Fires 2 rounds.

1. 3 second exposure Tactical Engagement, Evade, Draw, Assess, Dry Fire - 3 reps
2. 2 second exposure Tactical Engagement, Evade, Draw, Assess, Dry Fire - 3 reps
3. 1 second exposure Tactical Engagement, Evade, Draw, Assess, Dry Fire - 3 reps
4. 3 second exposure Tactical Engagement, Evade, Draw, Assess, E-Fire - 3 reps
5. 2 second exposure Tactical Engagement, Evade, Draw, Assess, E-Fire - 3 reps
6. 1 second exposure Tactical Engagement, Evade, Draw, Assess, E-Fire - 3 reps

Fig. 4

Tactical-Threat Pattern Recognition Firearms Training

Pattern Recognition Drill: Aggressor Weapon draw from the small of back.
*Description of Threat Pattern:*
Assailant has weapon positioned in the waistband in the small of his back. On cue, the assailant reaches behind his back, pulls the weapon around his body, raises the weapon to eye level and fires.

*Description of Officer Tactical Firearms Engagement:*
Upon threat recognition, the officer will perform the following steps.
Evade (step and slide out of kill zone), Draw, Assess, Fire 2 rounds I.     *Weapon Recognition Drill*
Description: Student watches video of aggressor raising a weapon from inside Position, Level I and Level II, speed intervals of 1 second, 4 seconds, 2 seconds and back to 1 second.
1.     1 second exposure / Inside Position / Dry Fire - 3 reps
2.     4 second exposure / Inside Position / Dry Fire - 3 reps
4.     2 second exposure / Inside Position / Dry Fire - 3 reps
5.     1 second exposure / Inside Position / Dry Fire - 3 reps 6.     1 second exposure / Level I Strong Side/ Dry Fire - 3 reps
7.     4 second exposure / Level I Strong Side / Dry Fire - 3 reps
8.     2 second exposure / Level I Strong Side / Dry Fire - 3 reps
9.     1 second exposure / Level I Strong Side / Dry Fire - 3 reps 10.     1 second exposure / Level II Strong Side / Dry Fire - 3 reps
11.     4 second exposure / Level II Strong Side/ Dry Fire - 3 reps
12.     2 second exposure / Level II Strong Side / Dry Fire - 3 reps
13.     1 second exposure / Level II Strong Side / Dry Fire - 3 reps 14.     1 second exposure / Level I Weak Side/ Dry Fire - 3 reps
15.     4 second exposure / Level I Weak Side / Dry Fire - 3 reps
16.     2 second exposure / Level I Weak Side / Dry Fire - 3 reps
17.     1 second exposure / Level I Weak Side / Dry Fire - 3 reps 18.     1 second exposure / Level II Strong Side/ Dry Fire - 3 reps
19.     4 second exposure / Level II Strong Side/ Dry Fire - 3 reps
20.     2 second exposure / Level II Strong Side / Dry Fire - 3 reps
21.     1 second exposure / Level II Strong Side / Dry Fire - 3 reps II.     *Deadly Force Context Recognition: Aggressor Target Inoculation Exercise*
Description: Aggressor target raises weapon and fires 2 rounds (pellets) into the kill zone at the designated (timed) intervals. Officer Evades, Draws, Assesses target (only)
1. 3 second exposure Tactical Engagement, Evade, Draw, Assess - 3 reps
2. 2 second exposure Tactical Engagement, Evade, Draw, Assess - 3 reps
3. 1 second exposure Tactical Engagement, Evade, Draw, Assess - 3 reps III.     *Deadly Force Context Recognition: Aggressor Target Engagement Exercise*
Description: Aggressor target raises weapon and fires 2 rounds (pellets) into the kill zone at the designated (timed) intervals. Officer Evades, Draws, Assesses, Fires 2 rounds
1. 3 second exposure Tactical Engagement, Evade, Draw, Assess, Dry Fire - 3 reps
2. 2 second exposure Tactical Engagement, Evade, Draw, Assess, Dry Fire - 3 reps
3. 1 second exposure Tactical Engagement, Evade, Draw, Assess, Dry Fire - 3 reps
4. 3 second exposure Tactical Engagement, Evade, Draw, Assess, E-Fire - 3 reps
5. 2 second exposure Tactical Engagement, Evade, Draw, Assess, E-Fire - 3 reps
6. 1 second exposure Tactical Engagement, Evade, Draw, Assess, E-Fire - 3 reps

Fig. 5

Tactical-Threat Pattern Recognition Firearms Training
Pattern Recognition Drill: Aggressor Cross Draw
*Description of Threat Pattern:*
Assailant has weapon positioned in a cross draw holster. On cue, the assailant reaches across his body, raises the weapon to eye level and fires.

*Description of Officer Tactical Firearms Engagement:*
Upon threat recognition, the officer will perform the following steps.
Evade (step and slide out of kill zone), Draw, Assess, Fire 2 rounds I. *Weapon Recognition Drill*
Description: Student watches video of aggressor raising a weapon from inside Position, Level I and Level II, speed intervals of 1 second, 4 seconds, 2 seconds and back to 1 second.
1. 1 second exposure / Inside Position / Dry Fire - 3 reps
2. 4 second exposure / Inside Position / Dry Fire - 3 reps
4. 2 second exposure / Inside Position / Dry Fire - 3 reps
5. 1 second exposure / Inside Position / Dry Fire - 3 reps 6. 1 second exposure / Level I Strong Side/ Dry Fire - 3 reps
7. 4 second exposure / Level I Strong Side / Dry Fire - 3 reps
8. 2 second exposure / Level I Strong Side / Dry Fire - 3 reps
9. 1 second exposure / Level I Strong Side / Dry Fire - 3 reps 10. 1 second exposure / Level II Strong Side / Dry Fire - 3 reps
11. 4 second exposure / Level II Strong Side/ Dry Fire - 3 reps
12. 2 second exposure / Level II Strong Side / Dry Fire - 3 reps
13. 1 second exposure / Level II Strong Side / Dry Fire - 3 reps 14. 1 second exposure / Level I Weak Side/ Dry Fire - 3 reps
15. 4 second exposure / Level I Weak Side / Dry Fire - 3 reps
16. 2 second exposure / Level I Weak Side / Dry Fire - 3 reps
17. 1 second exposure / Level I Weak Side / Dry Fire - 3 reps 18. 1 second exposure / Level II Strong Side/ Dry Fire - 3 reps
19. 4 second exposure / Level II Strong Side/ Dry Fire - 3 reps
20. 2 second exposure / Level II Strong Side / Dry Fire - 3 reps
21. 1 second exposure / Level II Strong Side / Dry Fire - 3 reps II. *Deadly Force Context Recognition: Aggressor Target Inoculation Exercise*
Description: Aggressor target raises weapon and fires 2 rounds (pellets) into the kill zone at the designated (timed) intervals. Officer Evades, Draws, Assesses target (only)
7. 3 second exposure Tactical Engagement, Evade, Draw, Assess - 3 reps
8. 2 second exposure Tactical Engagement, Evade, Draw, Assess - 3 reps
9. 1 second exposure Tactical Engagement, Evade, Draw, Assess - 3 reps III. *Deadly Force Context Recognition: Aggressor Target Engagement Exercise*
Description: Aggressor target raises weapon and fires 2 rounds (pellets) into the kill zone at the designated (timed) intervals. Officer Evades, Draws, Assesses, Fires 2 rounds
10. 3 second exposure Tactical Engagement, Evade, Draw, Assess, Dry Fire - 3 reps
11. 2 second exposure Tactical Engagement, Evade, Draw, Assess, Dry Fire - 3 reps
12. 1 second exposure Tactical Engagement, Evade, Draw, Assess, Dry Fire - 3 reps
13. 3 second exposure Tactical Engagement, Evade, Draw, Assess, E-Fire - 3 reps
14. 2 second exposure Tactical Engagement, Evade, Draw, Assess, E-Fire - 3 reps
15. 1 second exposure Tactical Engagement, Evade, Draw, Assess, E-Fire - 3 reps

Fig. 6

FIREARMS TRAINING METHOD USING PROTOCOL BASED UPON THREAT PATTERN RECOGNITION

RELATED APPLICATION DATA

This application claims the benefit of provisional patent application Ser. No. 61/734,134, filed Dec. 6, 2012, the disclosure of which is incorporated herein by reference.

BACKGROUND AND SUMMARY

This disclosure relates generally to methods of training simulation using a protocol based upon threat pattern recognition. The protocol encompasses the use of a training simulation technology, the presentation of a perceptual stimulus that accelerates the brain's ability to recognize a high-risk threat in time-compressed environments.

Between 2001 and 2010, assailants shot and killed 541 on-duty police officers. Of those killed, 343 were within five feet of the assailant and almost all while attempting to return fire. In fact, studies over the past 125 years have consistently revealed that deadly-force encounters primarily occur while officers are performing habitual duties within five feet of the assailant.

The methods described herein are directed toward training methods that tend to result in an increase an officer, soldier and peace-keeper's survivability by increasing their ability to recognize a threat and react with precision to a deadly force incident. The training methods described herein enhance officers' ability to instantly recognize pre-assault cues (Threat Pattern Recognition, or "TPR") and tactically respond in a manner that provides the officer additional time to evade, assess and, if necessary, engage with precision. Often recognition, response time, and precision are measured in terms of hundredths and tenths of a second. To facilitate objective measurements of recognition and response times and precision, the training methods described herein employ simulation technology, for instance, a firearms simulator. To further enhance the training protocol, simulation technology, for instance, a firearms simulator, capable of generating a simulation, and a perceptual stimulus to stimulate the trainee, is used. The stimuli are designed to orient conscious and subconscious attention to enhance learning.

BRIEF DESCRIPTION OF THE DRAWINGS

FIG. 1 is a chart of results of before and after use of a protocol discussed herein.

FIG. 2 is a chart of results of before and after use of another protocol discussed herein.

FIG. 4 is a chart of one embodiment of the protocol.

FIG. 5 is a chart of another embodiment of the protocol.

FIG. 6 is a chart of another embodiment of the protocol.

DETAILED DESCRIPTION

Figure 3:
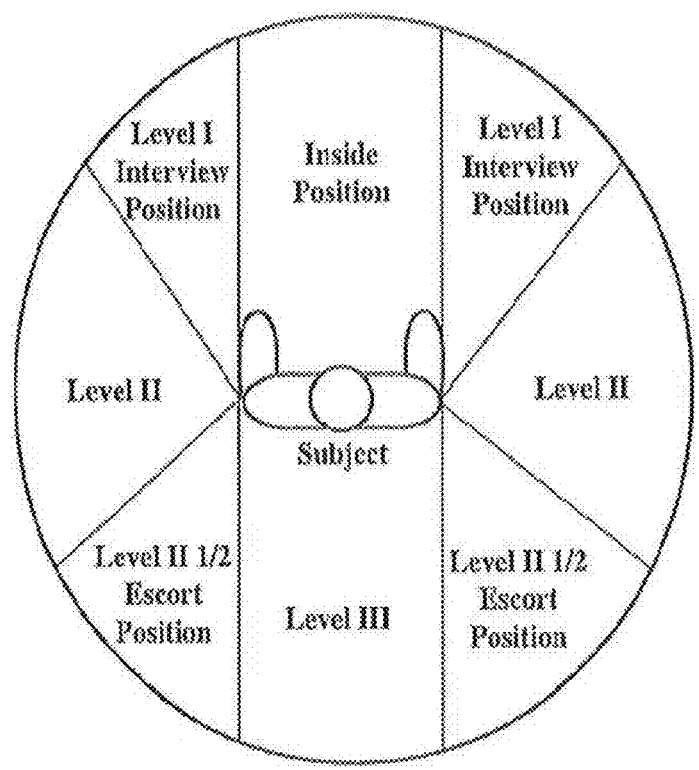
FIG. 3 is a diagram of a positioning model.

Research indicates that an assailant's movement time will always be faster than an officer's tactical response time. Specifically, an assailant's movement time can be as little as 0.37 to 0.86 seconds (depending upon the complexity of movement), in contrast to an officer's precision tactical response time needing anywhere from 1.47 to 2.4 seconds (depending on complexity). In a broad sense, the training develops a tactical transient (algorithm) to trigger assailant's reactionary cycle. The training focuses on a tactical transient involving the steps of evade, draw, assess, and return fire with precision. The training also focuses on a learning cue stimulus to create a "dopamine effect" via procedural memory to further develop the officer's procedural memory and effectiveness of interacting with the simulations.

Firearms simulator's capable of generating a simulation and a stimulus are provided by Advanced Interactive Systems—AIS Prism of Seattle, Wash., and may include a "shoot back" cannon. Such systems are described by example in U.S. Pat. Nos. 5,823,779 and 5,980,254, the disclosures of which are incorporated by reference herein. Such simulators also have the capability to measure the effectiveness of the officer's use of the firearm when interacting with the simulator including measuring precision and response time. These elements will be discussed in greater detail below. Although the simulator described above is capable of generating a negative stimulus, i.e., via the "shoot back" cannon, a simulator or simulation capable of performing a positive stimulus may also be used. The stimulus may also be provided directly by the simulation and not directly by the simulator.

Generally speaking, the pre-frontal cortex of the human brain controls nervous system functions that control decision making and execution of motor skills. More specifically, the pre-frontal cortex is a convergence zone between the perceptual blending of senses, cognitive processing, and decision-making. The pre-frontal cortex is the site for precision. It helps establish perception, analysis, processing, decision-making, response selection, preparation of precision motor skills, and calculation of proportional responses. The pre-frontal cortex creates working memory and organizes structures of memory. The prefrontal cortex is also the site of controls for moral, ethical, and social behavior. The pre-frontal cortex sustains attention, and stops distraction and over-focus. The prefrontal cortex also monitors and corrects responses, and processes time.

In the context of the training schemes described herein, the stages of response time may be broken down as follows: visual-cognitive attention switching usually takes on average about 220 msec. Visual recognition time usually takes on average about 220 msec. Cognitive processing time usually takes on average about 260 msec. Movement usually takes on average about 200 msec.

The training protocol described herein is directed at eliminating visual cognitive attention switching and cognitive processing by developing procedural memory for creating precision-based automaticity in survival engagements where time and distance are minimal, but precision is required. The training protocol is directed at overcoming sympathetic nervous system responses, such as, anxiety and fear, which generates startled responses, and, which in turn generates orientation reflex symptoms, such as, binocular dominance, bi-lateral symmetry, perceptual narrowing, threat fixation (cognitively) and loss of precision motor skills, and survival instincts (e.g., freeze, flight, fight, submissive behavior, feedback loop).

The training protocol described herein overcomes significant observed discrepancies between average officer firearms qualification statistics and actual survival engagements. For instance, the national accuracy average of officer firearms requalification is about 86%. FBI data for 60 years reveals that average officer firearms accuracy associated with deadly force encounters is about 18%. New York Police Department and State of Michigan reports from 1980 reveal average officer firearms accuracy associated with deadly force encounters is about 31% and 32%, respectively. New York Police Department reports from 1998 to 2006 show average officer firearms accuracy associated with deadly force encounters is about 18%.

The training protocol described herein focuses on developing survivability and accuracy through procedural memory. Memory is a combination of what we know, recall, and remember after searching. The time for a person to automatically know and recognize a threat stimulus is about 0.2 (+) seconds. The time for a person to recall is about 0.6 seconds. The time for a person to remember after searching long term memory is about 1.5 seconds. Procedural memory comprises perceptual-induced motor skills involving sequential sub-routines that are triggered automatically, and do not require conscious attention. Through the procedures described herein, the process for developing procedural memory can be advanced through the effective use of a firearms simulator rather through repetition and rote memorization. The training protocols described herein are designed to create a link between pre-assault cues (non-verbal cues, verbal cues, physical actions), assault cues (passive/defensive resistance, active aggressions, deadly force acts), and generate tactical responses that are controlled and precise with minimal repetition. In summary, the training protocols seek to: (i) instruct officers to instantly recognize an assailant's pre-assault cues; and (ii) train officers to engage a deadly force threat with precision. The portion of the training dealing with tactical engagement may comprise the steps of: (a) evade; (b) draw; and (c) (1) assess, or (c) (2) assess and engage.

The training protocol key design elements include: (y) object recognition; and (z) context recognition. By providing a stimulus (e.g., positive or negative event(s)), the object and context recognition is linked with response solutions that enable tactical responses that are controlled and precise. An officer's re-action is always slower than action, so an officer can never survive if he/she maintains a stationary tactical solution. Upon threat detection, the training protocols emphasize that the officer immediately evade the kill zone. Evading triggers the assailant's reactionary process, which requires the assailant to re-engage the officer and provide the officer a reactionary advantage. As will be described below in more detail, in the context of firearm object recognition, a trainee observes a video in a firearms simulator of an aggressor weapon draw from various positions. A positioning model is shown in FIG. 3.

As described below, the simulation is designed to train the trainee's mind's eye by stages sequences of 1 second (i.e., real time), 4 seconds (i.e., 25% of real time), 2 seconds (i.e., 50% of real time), and 1 second intervals (i.e., real time). The trainee processes the context of the training with the addition of the stimulus event, for instance, evading a shoot-back cannon fire, at sequences of 4 seconds, 2 seconds and 1 second. The trainee works on perfecting a tactical response in connection with the introduction of the stimulus, for instance, by evasion (e.g., usually a step and slide to a new position), and to draw a weapon and assess (usually taught as one motor skill); and as necessary (depending on the simulation), to engage by firing rounds and re-assessing threat.

FIG. 1 is a chart showing results before and after of use of the training protocol. In the chart of FIG. 1, columns (a)-(g) show the statistics associated with the officers (sample size 31 officers) interacting with the training simulation. The aggressor's movement time is shown in column (a). The time for the officer to fire his first shot is shown in column (b). The officer's reaction time is shown in column (c). The average number of rounds fired by the officer is shown in column (d). The average number of rounds engaging the target is shown in column (e). Data as to whether the officer was wounded is shown in column (f), and the officer's accuracy interacting with the simulation shown in column (g). In the chart of FIG. 1, steps (1)-(7) show various interactions of the trainees with the simulator. In steps (1), (2), and (3), the trainee is shown three different simulations each with a silhouette of an aggressor drawing a weapon from different positions. In each case, the firearms simulator is programmed to prevent generation of the stimulus, i.e., the "shoot back" cannon is deactivated. As indicated in the chart, in each of the steps (1), (2), and (3), the officer is instructed to place his weapon in the indicated position. In each of the steps (1)-(3), the officer's accuracy in interacting with the simulation is relatively high. The data in steps (1)-(3) correlate with the historic data above that in a static situation, an officer's performance and marksmanship is relatively high.

At step (4), the simulator is programmed to generate the negative stimulus, i.e., the "shoot back" cannon is activated and discharges a plastic pellet at the officer at a velocity of approximately 300 ft./s. At step (4), in columns (a)-(g), the officer's effectiveness in interacting with the simulation is significantly lowered. The data in step 4 correlates to the historic data above and when faced with a deadly force encounter, an officer's performance is degraded.

Steps (5)-(7) reflect data after the officer completes the training protocols described herein. In each of the steps (5)-(7), the data reflects an evaluation of the last step of the protocol with the officer experiencing the simulation running in full speed, but after the officer has completed the training protocols described herein. As shown, the officer's effectiveness in interacting with the simulation increases dramatically.

FIG. 2 shows a chart of results with data that is similar to the data of chart of FIG. 1. In FIG. 2, steps (1), (2), and (3), the trainee is shown three different simulations each with a silhouette of an aggressor drawing a weapon from different positions. In each of the steps (1)-(3), the firearms simulator is programmed to prevent generation of the stimulus, i.e., the "shoot back" cannon is deactivated. At step (4), the simulator is programmed to generate the negative stimulus, i.e., the "shoot back" cannon is activated and discharges a plastic pellet at the officer. At step (4), in columns (a)-(g), the officer's effectiveness in interacting with the simulation is significantly lowered. The steps (5)-(8) reflect data after the officer completes the training protocols described herein. Step (5) shows data after the last step in the protocol with a simulation running at full speed (i.e., real time). Step (6) shows data after the last step in the protocol with a simulation running at 25% real time speed. Step (7) shows data after the last step in the protocol with a simulation running at 50% real time speed. Step (8) shows data after the last step in the protocol with a simulation running at full speed.

As shown by the data of the charts of FIGS. 1 and 2, the officers improved in interacting with the simulator after completing the training protocols described herein. In each test, although the officer's reaction time and time to fire a first shot were significantly later and longer than the aggressor's time movement, the officer's initial steps of evasion and reassessment, enabled the officers to increase their accuracy. The increasing accuracy was especially significant given the negative stimulus provided by the firearm simulator, i.e., the "shoot back" cannon.

FIGS. 4-6 provide exemplary embodiments of protocols that may be applied to a simulation. In FIGS. 4-5, the protocols make reference to the positioning model of FIG. 3. In FIG. 4, the simulation is designed to depict an assailant with a weapon drawn and held at the side of his leg. On cue, the assailant raises the weapon to eye level and fires. Before beginning the simulation the officer is instructed that upon threat recognition to perform the primary tactical response steps: (i) evade (step and slide out of kill zone), (ii) draw, and (iii) assess; and depending upon the step in the simulation the secondary tactical response of engagement of the assailant (i.e., fire rounds). The steps of the protocol gradually bring the student to a simulation involving a deadly force engagement encounter. Step I allows the student to develop threat recognition patterns by repeated viewing of the simulation without live fire shoot back. In Step I, the student watches video of aggressor raising a weapon from inside Position, Level I and Level II, speed intervals of 1 second, 4 seconds, 2 seconds and back to 1 second. In Step II, students are introduced to the tactical firearms engagement method of shooting, which includes the steps discussed above of (i) evade (step and slide out of kill zone), (ii) draw, (iii) assess, and (iv) fire. Students perform the protocol of step in the context of the same simulation presented to the student in Step I. Step III is a static training exercise and a walk-through of e deadly force encounter that will follow in Steps IV and V. In Step IV, the simulation is configured to enable the shoot-back cannon so the simulation will depict the assailant raising the weapon and fires several (e.g., 2) rounds (pellets) into the kill zone at the designated (timed) intervals. The student is instructed to perform the steps of (i) evades, (ii) draws, and (iii) assesses the assailant target. In Step V, the steps of Step IV are performed but the student is instructed to perform the steps of (i) evades, (ii) draws, (iii) assesses, and (iv) fire and engage the assailant target.

The protocol of FIG. 5 and FIG. 6 is similar to FIG. 4, but omits the static training exercises, presuming the student is familiar therewith. Both protocols of FIGS. 5 and 6 use significant exposure to recognition of a threat pattern in Step I, the primary tactical response steps in Step II, and the primary and secondary tactical responses in Step III. In the protocol of FIG. 5, the assailant has weapon positioned in the waistband in the small of his back. On cue, the assailant reaches behind his back, pulls the weapon around his body, raises the weapon to eye level and fires. In the protocol of FIG. 6, the assailant has a weapon positioned in a cross draw holster. On cue, the assailant reaches across his body, raises the weapon to eye level and fires.

Figure 7:
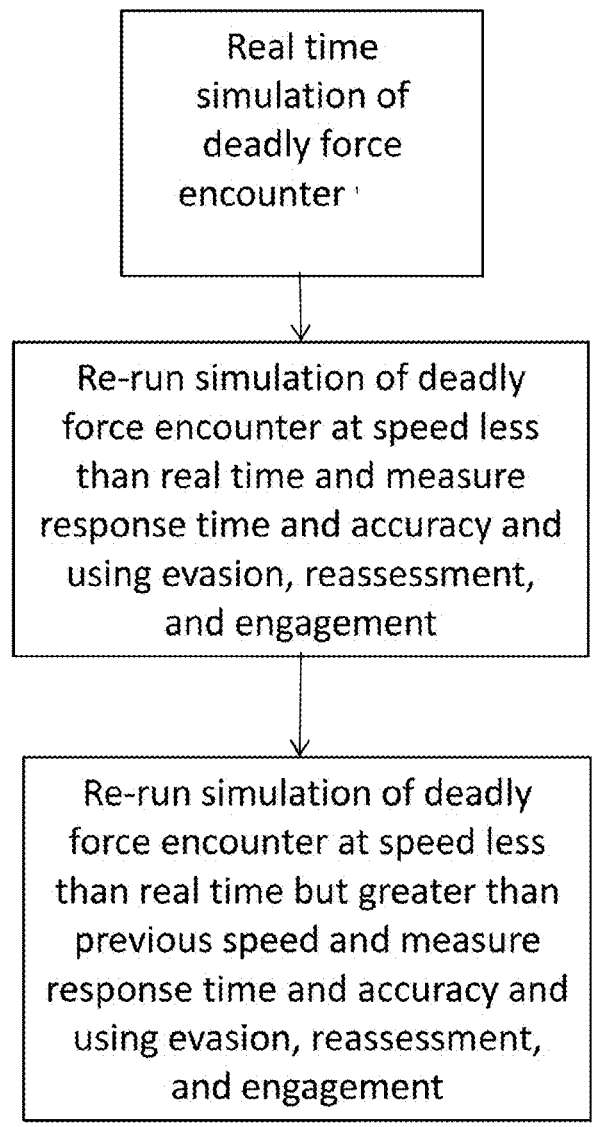
FIG. 7 is flow diagram of an embodiment of a protocol.
Figure 8:
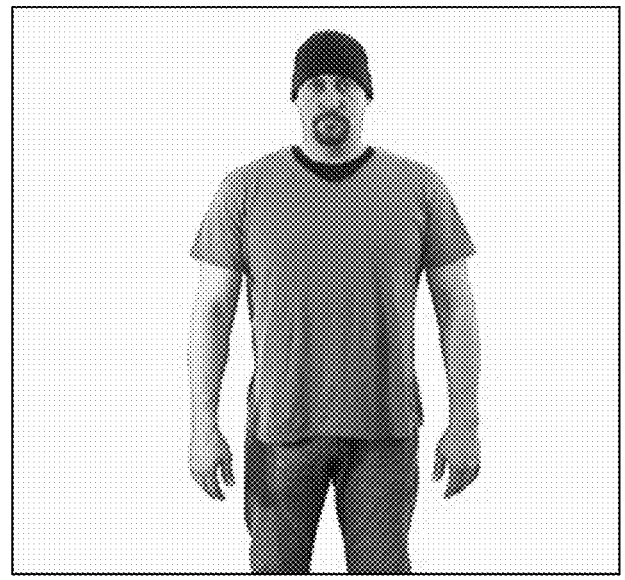
FIGS. 8-15 are still frames from a video of a representative simulation.
Figure 9:
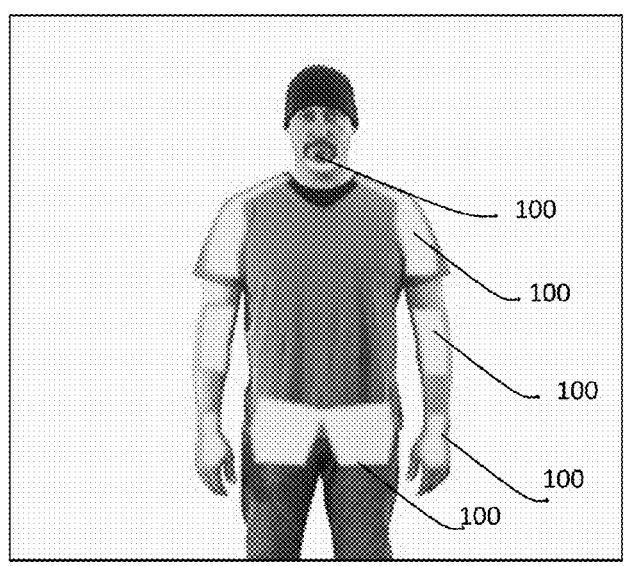
Figure 10:
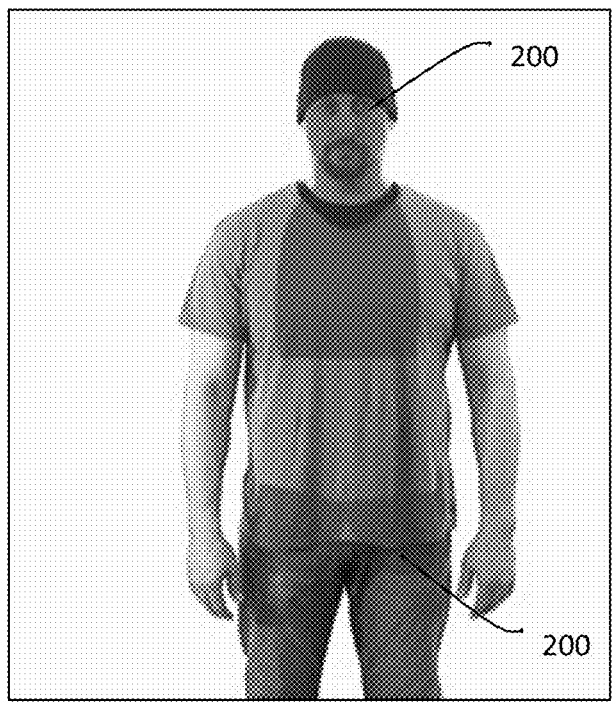
Figure 11:
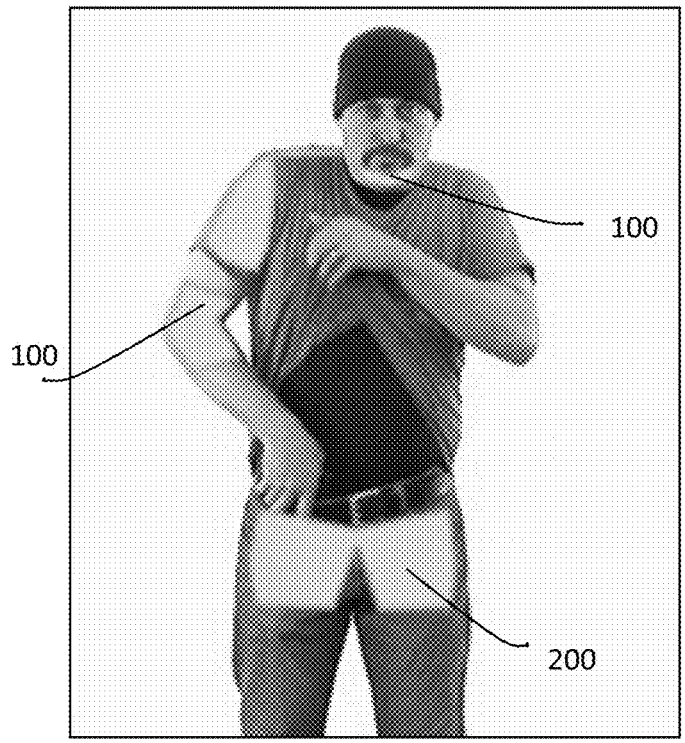
Figure 12:
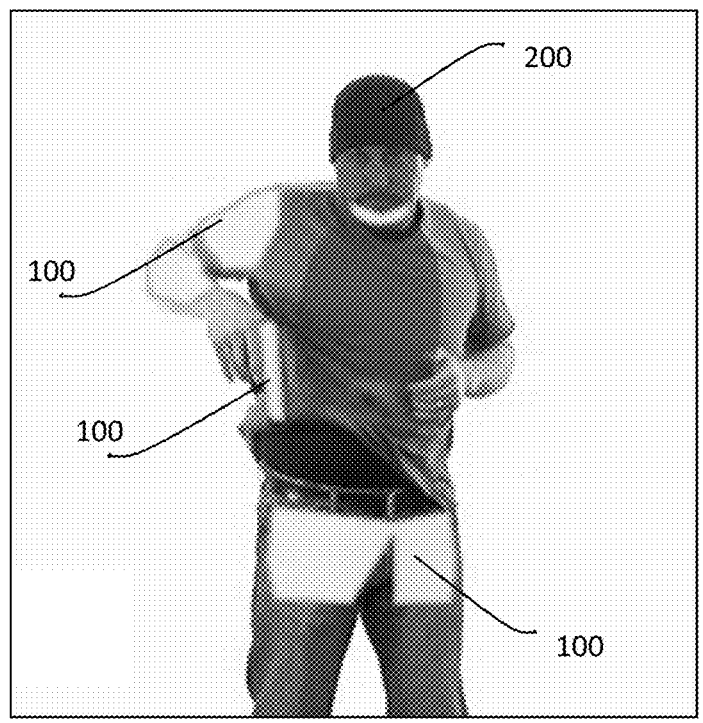
Figure 13:
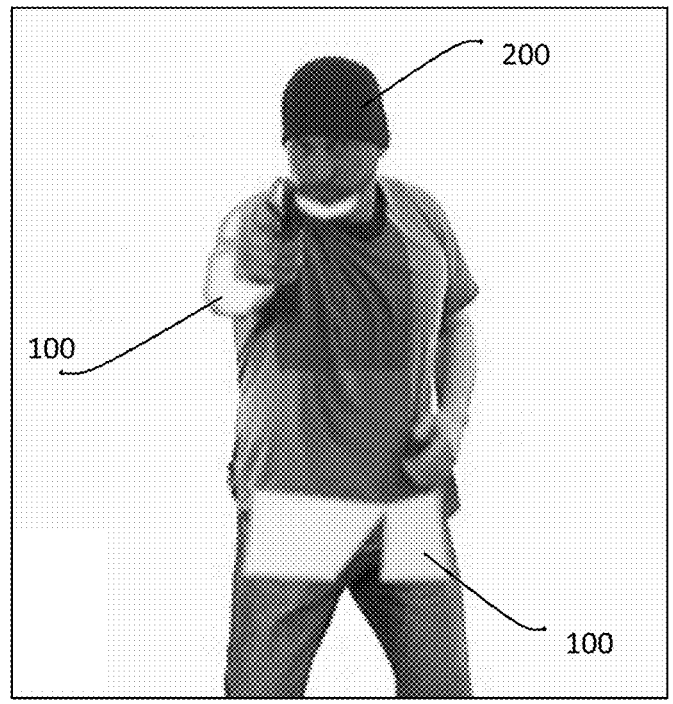

Other simulations may be developed to provide student trainees with realistic threats other than those describe herein. The simulations described herein were intended to exemplary and not limiting in any sense. The simulations may be shortened or lengthened as desired. The simulations may have one or more threats. However, the general steps of the protocols, for instance, as shown in FIGS. 5 and 6 may be applied to any simulation or any threat in the simulation. FIG. 7 is intended to provide a summary of the application of the primary and secondary tactical responses in developing a protocol for any simulation. Although the protocol described herein relates to use of a firearm, the protocols may also be used in other training, including flight simulation, battle field exercises, combat, etc. The stimulus may be positive or negative.

FIGS. 8-15 show still frames from a video comprising a representative simulation. The simulation may have a weapon recognition portion. For instance, FIGS. 8-13 are examples of a weapon recognition portion of the simulation. The weapon recognition portion of the simulation may be designed to specifically train the trainee in the sequences associated with the assailant presenting the weapon to engage the trainee from different positions on the positioning model of FIG. 3. For instance, FIGS. 8-15 are from the inside position.

Figure 14:
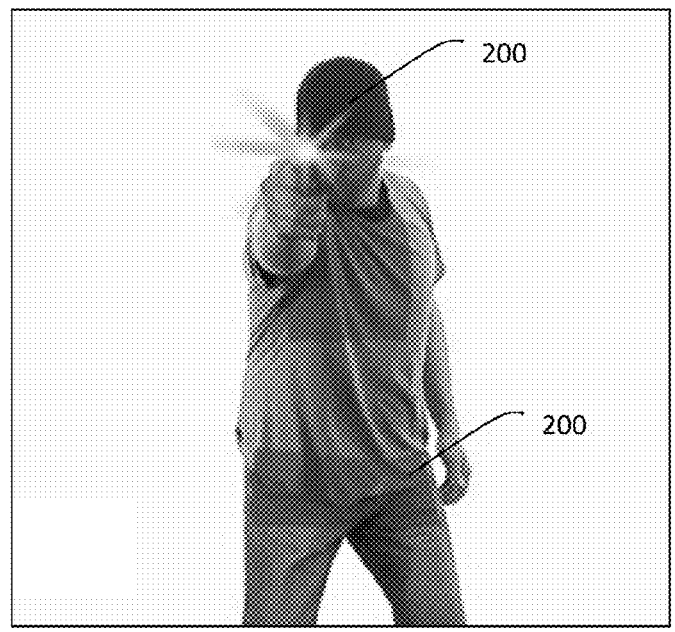
Figure 15:
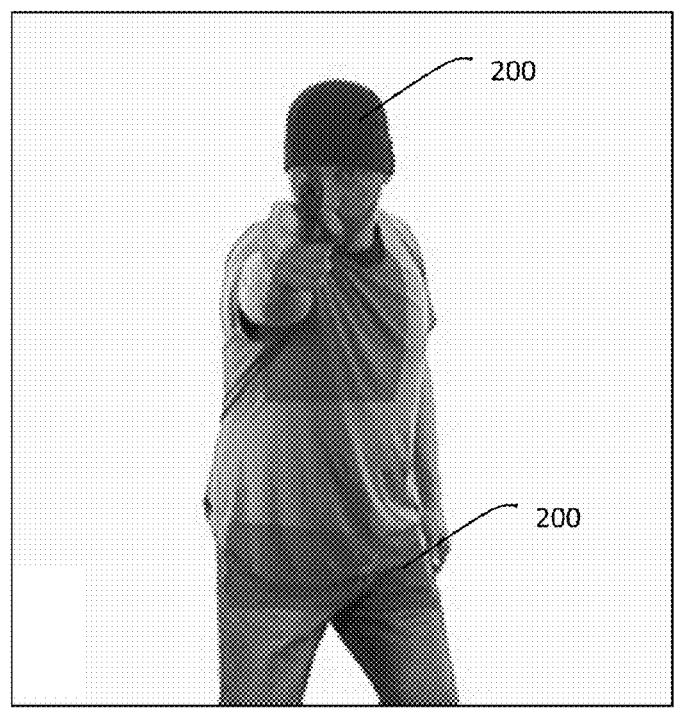

The simulation may also have a threat engagement portion. For instance, FIGS. 14-15 are examples of a threat engagement portion of the simulation. The threat engagement portion of the simulation may be designed to specifically train the trainee in the sequences associated with the assailant engaging the trainee with the weapon and the trainee's tactical response thereto, including the steps of evasion (usually a step and slide to a new position) and to draw a weapon and assess (usually taught as one motor skill); and as necessary engage by firing rounds and re-assessing threat.

The simulation may be animated with color schemes to further assist the trainee in recognizing the patterns. The amination may comprise color patterns superimposed over the video of the simulation. For instance, key muscle movements may be highlighted with color to provide enhanced visual stimulus to further train the trainee in interacting with the simulation. In the alternative, or in addition to, preferred targeting location to engage the assailant may be highlighted with color to provide enhanced visual stimulus to further train the trainee in interacting with the simulation. The colors used for targeting information and muscle movement may be contrasting. The muscle movement locations of the assailant may include the potential location of a weapon on assailant, the location of the assailant hands relative to a suspected weapon location, the facial expressions of the assailant, arm orientation, leg orientation, or clothing. The targeting location may include the head, chest, or pelvic bowl. Animation for targeting location may be red. Animation for muscle movement may be yellow. In FIGS. 8-15, amination for muscle movement is indicated by reference character 100, and animation for targeting location is indicated by reference character 200.

The embodiments were chosen and described in order to best explain the principles of the disclosure and their practical application to thereby enable others skilled in the art to best utilize said principles in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:
1. A method comprising:
providing a firearm training simulation wherein the firearm training simulation depicts an assailant presenting a weapon to engage a trainee interacting with the simulation to simulate a deadly force encounter between the trainee and the assailant of the simulation, the simulation having a recognition portion comprising a video of the assailant presenting the weapon to engage the trainee and an engagement portion being representative of the assailant engaging the trainee with the weapon, the engagement portion comprising a learning cue stimulus configured to stimulate the trainee;

applying color patterns to the video in a manner such that the color patterns are superimposed over portions of the video of the assailant presenting the weapon, the color patterns being configured to stimulate the trainee concerning muscle movement locations of the assailant presenting the weapon; and instructing the trainee in weapon recognition by directing the trainee to observe the color patterns of the video of the recognition portion of the simulation, and by presenting the recognition portion of the simulation to the trainee at least three times, a first time weapon pattern recognition presentation being the presentation of the recognition portion of the simulation at first speed corresponding to real time, a second time weapon pattern recognition presentation being the presentation of the recognition portion of the simulation at a second speed that is less than the first speed, and a third time weapon pattern recognition presentation being the presentation of the recognition portion of the simulation at a third speed that is less than the first speed but greater than the second speed; and training the trainee in tactical engagement of the assailant by presenting the recognition portion and the engagement portion of the simulation to the trainee at least three times, a first time tactical engagement presentation being the presentation of the recognition portion of the simulation and the engagement portion of the simulation at first speed corresponding to real time, a second time tactical engagement presentation being the presentation of the recognition portion and the engagement portion of the simulation at a second speed that is less than the first speed, and a third time tactical engagement presentation being the presentation of the recognition portion and the engagement portion of the simulation at a third speed that is less than the first speed but greater than the second speed; and wherein the learning cue stimulus is negative.

2. The method of claim 1, wherein the step of training the trainee in tactical engagement of the assailant includes instructing the trainee to evade the negative stimulus after observing a selected color pattern.

3. The method of claim 2, wherein the step of training the trainee in tactical engagement of the assailant includes instructing the trainee to draw a weapon to engage the assailant after observing a selected color pattern.

4. The method of claim 3, wherein the step of training the trainee in tactical engagement of the assailant includes instructing the trainee to assess the assailant after observing a selected color pattern.

5. The method of claim 4, wherein the step of training the trainee in tactical engagement of the assailant includes instructing the trainee to fire the weapon at the assailant after observing a selected color pattern.

6. The method of claim 1, further comprising instructing the trainee in tactical engagement of the assailant by presenting the engagement portion of the simulation to the trainee with instructions to evade the negative stimulus after observing a selected color pattern, wherein the step of training the trainee in tactical engagement occurs after instructing the trainee in weapon recognition and before training the trainee in tactical engagement.

7. The method of claim 1, further comprising instructing the trainee in tactical engagement of the assailant by presenting the engagement portion of the simulation to trainee with instructions to evade the negative stimulus after observing a selected color pattern and then to draw a weapon to engage the assailant, wherein the step of training the trainee in tactical engagement occurs after instructing the trainee in weapon recognition and before training the trainee in tactical engagement.

8. The method of claim 1, further comprising instructing the trainee in tactical engagement of the assailant by presenting the engagement portion of the simulation to trainee with instructions to evade the negative stimulus after observing a selected color pattern, then to draw a weapon to engage the assailant, and then to assess the assailant; wherein the step of training the trainee in tactical engagement occurs after instructing the trainee in weapon recognition and before training the trainee in tactical engagement.

9. The method of claim 1, further comprising instructing the trainee in tactical engagement of the assailant by presenting the engagement portion of the simulation to trainee with instructions to evade the negative stimulus after observing a selected color pattern, then to draw a weapon to engage the assailant, then to assess the assailant, and then to fire on the assailant; wherein the step of training the trainee in tactical engagement occurs after instructing the trainee in weapon recognition and before training the trainee in tactical engagement.

10. The method of claim 1, further comprising assessing the trainee's effectiveness in interacting with the simulation.

11. The method of claim 1, wherein the second speed of the step of instructing the trainee in weapon recognition comprises about 25% of real time speed.

12. The method of claim 1, wherein the third speed of the step of instructing the trainee in weapon recognition comprises about 50% of real time speed.

13. The method of claim 1, wherein the second speed of the step of training the trainee in tactical engagement comprises about 25% of real time speed.

14. The method of claim 1, wherein the third speed of the step of training the trainee in tactical engagement comprises about 50% of real time speed.

15. The method of claim 1, wherein step of training the trainee in tactical engagement further comprises presenting the recognition portion and the engagement portion of the simulation to the trainee a fourth time after the third time, the fourth time tactical engagement presentation being the presentation of the recognition portion of the simulation and the engagement portion of the simulation a the first speed.

16. The method of claim 1, wherein step of training the trainee in tactical engagement further comprises presenting the recognition portion and the engagement portion of the simulation to the trainee a fourth time after the third time, the fourth time tactical engagement presentation being the presentation of the recognition portion of the simulation and the engagement portion of the simulation a the first speed.

17. A method comprising:

providing a firearm training simulation wherein the firearm training simulation depicts an assailant presenting a weapon to engage a trainee interacting with the simulation to simulate a deadly force encounter between the trainee and the assailant of the simulation, the simulation having a recognition portion comprising a video of the assailant presenting the weapon to engage the trainee, and including an engagement portion that comprises a learning cue, wherein the learning cue stimulus is a negative stimulus;

applying color patterns to the video in a manner such that the color patterns are superimposed over portions of the video of the assailant presenting the weapon, the color patterns being configured to stimulate the trainee concerning muscle movement locations of the assailant presenting the weapon; and instructing the trainee in weapon recognition by directing the trainee to observe the color patterns of the video of the recognition portion of the simulation, and by presenting the recognition portion of the simulation to the trainee at least three times, a first time weapon pattern recognition presentation being the presentation of the recognition portion of the simulation at first speed corresponding to real time, a second time weapon pattern recognition presentation being the presentation of the recognition portion of the simulation at a second speed that is less than the first speed, and a third time weapon pattern recognition presentation being the presentation of the recognition portion of the simulation at a third speed that is less than the first speed but greater than the second speed.

18. The method of claim 17, wherein the second speed of the step of instructing the trainee in weapon recognition comprises about 25% of real time speed.

19. The method of claim 17, wherein the third speed of the step of instructing the trainee in weapon recognition comprises about 50% of real time speed.

* * * * *